US012682555B2

(12) United States Patent
E et al.

(10) Patent No.: US 12,682,555 B2
(45) Date of Patent: Jul. 14, 2026

(54) METHOD AND APPARATUS FOR RENDERING VIRTUAL CLOTHING

(71) Applicant: Beijing Zitiao Network Technology Co., Ltd., Beijing (CN)

(72) Inventors: Yanzhi E, Beijing (CN); Qi Li, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 280 days.

(21) Appl. No.: 18/560,745

(22) PCT Filed: May 9, 2022

(86) PCT No.: PCT/CN2022/091656
§ 371 (c)(1),
(2) Date: Nov. 14, 2023

(87) PCT Pub. No.: WO2022/257676
PCT Pub. Date: Dec. 15, 2022

(65) Prior Publication Data
US 2024/0221287 A1 Jul. 4, 2024

(30) Foreign Application Priority Data
Jun. 10, 2021 (CN) .......................... 202110648104.3

(51) Int. Cl.
*G06T 15/20* (2011.01)
*G06T 7/70* (2017.01)

(52) U.S. Cl.
CPC ............... *G06T 15/20* (2013.01); *G06T 7/70* (2017.01); *G06T 2210/16* (2013.01)

(58) Field of Classification Search
CPC ........ G06T 15/20; G06T 7/70; G06T 2210/16
See application file for complete search history.

(56) References Cited

U.S. PATENT DOCUMENTS 10,242,498 B1 3/2019 Leong et al.
10,909,744 B1 * 2/2021 Stuyck ................... G06T 15/04

FOREIGN PATENT DOCUMENTS

CN 103456042 A 12/2013
CN 105654334 A * 6/2016 ............. G06T 17/00
(Continued)

OTHER PUBLICATIONS

Gillette, Russell, et al. "Real-time dynamic wrinkling of coarse animated cloth." Proceedings of the 14th ACM Siggraph/eurographics symposium on computer animation. 2015. (Year: 2015).*
(Continued)

*Primary Examiner* — Xin Sheng
(74) *Attorney, Agent, or Firm* — Alleman Hall LLP

(57) ABSTRACT

A method and apparatus for rendering virtual clothing, which relate to the field of graphics technology. The method includes: acquiring posture information of a target object; acquiring a target position of each mesh vertex of virtual clothing based on the posture information, the target position of each mesh vertex of the virtual clothing includes a position of each mesh vertex of the virtual clothing after the virtual clothing is deformed based on the posture informa-tion; acquiring a normal direction of each position of the virtual clothing based on the target position of each mesh vertex of the virtual clothing; and rendering the virtual clothing based on the normal direction of each position of the virtual clothing and outputting a rendered effect image of the virtual clothing.

18 Claims, 4 Drawing Sheets

(56)        References Cited

FOREIGN PATENT DOCUMENTS

| | | | | |
|---|---|---|---|---|
| CN | 106096130 | A | 11/2016 | |
| CN | 106096132 | A | 11/2016 | |
| CN | 106780766 | A | 5/2017 | |
| CN | 108510594 | A * | 9/2018 | ......... G06Q 30/0643 |
| CN | 110176063 | A * | 8/2019 | ........... G06T 19/006 |
| CN | 111773688 | A | 10/2020 | |
| CN | 112652061 | A | 4/2021 | |
| JP | 2005011027 | A | 1/2005 | |

OTHER PUBLICATIONS

China National Intellectual Property Administration, Office Action Issued in Application No. 202110648104.3, Jul. 3, 2025, 16 pages.
Pan, R., "Research on Pan-Animation Creativity and Talent Cultivation," China Radio & Television Publishing House, Oct. 31, 2010, 16 pages.
ISA China National Intellectual Property Administration, International Search Report and Written Opinion Issued in Application No. PCT/CN2022/091656, Jul. 19, 2022, 13 Pages.

* cited by examiner

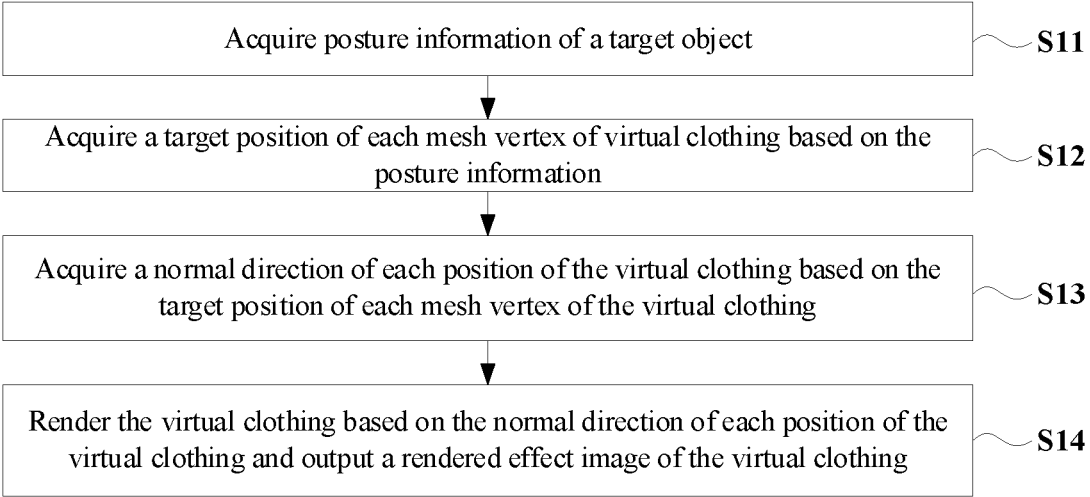

| | |
|---|---|
| Acquire posture information of a target object | ～S11 |
| Acquire a target position of each mesh vertex of virtual clothing based on the posture information | ～S12 |
| Acquire a normal direction of each position of the virtual clothing based on the target position of each mesh vertex of the virtual clothing | ～S13 |
| Render the virtual clothing based on the normal direction of each position of the virtual clothing and output a rendered effect image of the virtual clothing | ～S14 |

FIG. 1

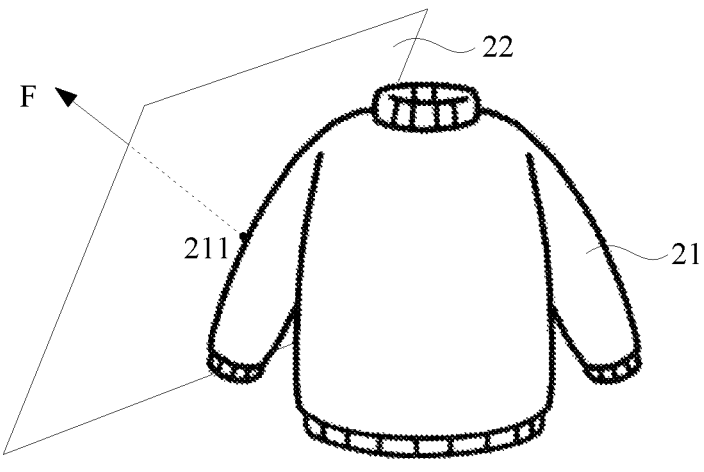

FIG. 2

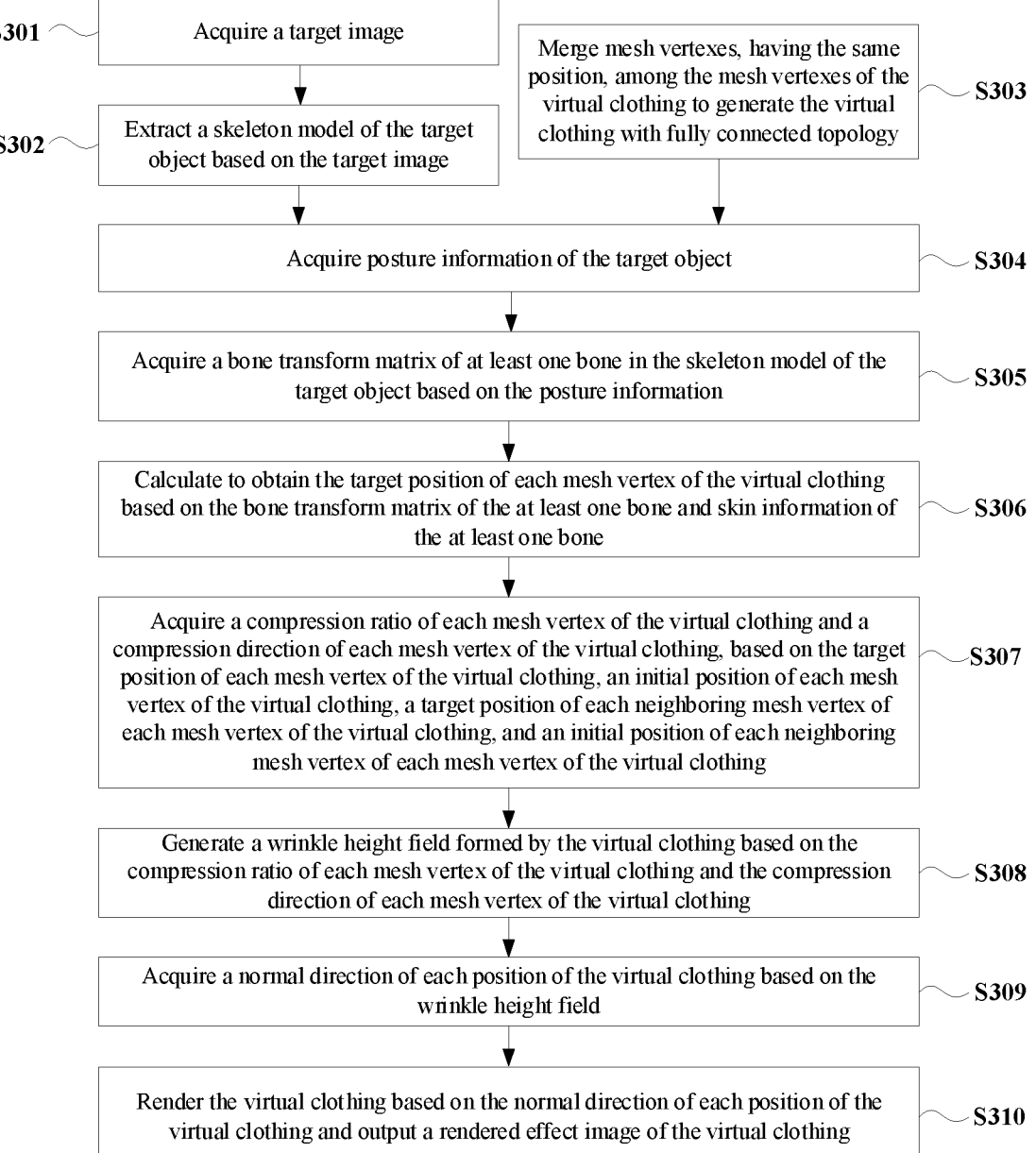

S301 — Acquire a target image

S302 — Extract a skeleton model of the target object based on the target image

S303 — Merge mesh vertexes, having the same position, among the mesh vertexes of the virtual clothing to generate the virtual clothing with fully connected topology S304 — Acquire posture information of the target object S305 — Acquire a bone transform matrix of at least one bone in the skeleton model of the target object based on the posture information S306 — Calculate to obtain the target position of each mesh vertex of the virtual clothing based on the bone transform matrix of the at least one bone and skin information of the at least one bone S307 — Acquire a compression ratio of each mesh vertex of the virtual clothing and a compression direction of each mesh vertex of the virtual clothing, based on the target position of each mesh vertex of the virtual clothing, an initial position of each mesh vertex of the virtual clothing, a target position of each neighboring mesh vertex of each mesh vertex of the virtual clothing, and an initial position of each neighboring mesh vertex of each mesh vertex of the virtual clothing S308 — Generate a wrinkle height field formed by the virtual clothing based on the compression ratio of each mesh vertex of the virtual clothing and the compression direction of each mesh vertex of the virtual clothing S309 — Acquire a normal direction of each position of the virtual clothing based on the wrinkle height field S310 — Render the virtual clothing based on the normal direction of each position of the virtual clothing and output a rendered effect image of the virtual clothing

FIG. 3

METHOD AND APPARATUS FOR RENDERING VIRTUAL CLOTHING

This application is a national stage of the International application PCT/CN2022/091656, filed on May 9, 2022. This International application claims priority to Chinese Patent Application No. 202110648104.3, filed on Jun. 10, 2021. All of these applications are hereby incorporated by reference in their entireties.

TECHNICAL FIELD

The present disclosure relates to the field of graphics technology, and in particular to a method and apparatus for rendering virtual clothing.

BACKGROUND

The application of rendering of virtual clothing in daily life has been very extensive. For example, virtual fitting implemented based on virtual clothing rendering technology may utilize image acquisition apparatuses to capture the user's posture in real time and render the virtual clothing to the user's body. In this way, the user realizes fitting without complex operation, which greatly improves the efficiency of fitting.

In order to enhance the sense of reality of the rendered virtual clothing, the virtual clothing needs to change accordingly with the user's posture. In the prior art, there are mainly two implementation solutions to make virtual clothing change with the user's posture, one is: using skeletal animation to drive the virtual clothing to change with the user's posture, and the other is: using physical simulation technology to make the virtual clothing change with the user's posture. However, the way of using skeletal animation to drive the virtual clothing to change with the user's posture can only make the overall posture of the virtual clothing to change with the user's posture, but can not dynamically produce clothing wrinkles that should be produced as the user's posture changes, which leads to a poor sense of reality. The way of using physical simulation technology to make the virtual clothing change with the user's posture although it can produce clothing wrinkles that should be produced as the user's posture changes, but this way is too large in the amount of computation, has excessive high requirements for device performance, and is easy to cause lagging and other problems.

SUMMARY

In view of the above, embodiments of the present disclosure provide a method and apparatus for rendering virtual clothing, for reducing the amount of computation for rendering of virtual clothing while enabling the virtual clothing to produce a wrinkle effect as the user's posture changes.

In order to achieve the above objectives, the disclosed embodiment provides the following technical solution.

In a first aspect, an embodiment of the present disclosure provides a method for rendering virtual clothing, including:

acquiring posture information of a target object;

acquiring a target position of each mesh vertex of virtual clothing based on the posture information, the target position of each mesh vertex of the virtual clothing includes a position of each mesh vertex of the virtual clothing after the virtual clothing is deformed based on the posture information;

acquiring a normal direction of each position of the virtual clothing based on the target position of each mesh vertex of the virtual clothing; and rendering the virtual clothing based on the normal direction of each position of the virtual clothing and outputting a rendered effect image of the virtual clothing.

As a possible implementation of the embodiment of the present disclosure, acquiring a target position of each mesh vertex of virtual clothing based on the posture information includes:

acquiring a bone transform matrix of at least one bone in a skeleton model of the target object based on the posture information, the bone transform matrix of any bone is a matrix that transforms the bone from an initial position to a position corresponding to the posture information; and calculating to obtain the target position of each mesh vertex of the virtual clothing based on the bone transform matrix of the at least one bone and skin information of the at least one bone; the skin information of any bone includes an impact weight of the bone on each mesh vertex of the virtual clothing.

As a possible implementation of the embodiment of the present disclosure, calculating to obtain a target position of each mesh vertex of the virtual clothing based on the bone transform matrix of the at least one bone and skin information of the at least one bone includes:

acquiring an impact value of each bone of the at least one bone on each mesh vertex of the virtual clothing, the impact value of any bone on any mesh vertex includes a product of the impact weight of the bone on the mesh vertex, the bone transform matrix of the bone, and an initial position of the mesh vertex; and summing impact values of the at least one bone on a same mesh vertex of the virtual clothing to acquire the target position of each mesh vertex of the virtual clothing.

As a possible implementation of the embodiment of the present disclosure, before acquiring a bone transform matrix of at least one bone in a skeleton model of the target object based on the posture information, the method further includes:

acquiring a target image, the target image includes the target object; and extracting the skeleton model of the target object based on the target image.

As a possible implementation of the embodiment of the present disclosure, acquiring a normal direction of each position of the virtual clothing based on the target position of each mesh vertex of the virtual clothing includes:

acquiring a compression ratio and a compression direction of each mesh vertex of the virtual clothing based on the target position of each mesh vertex of the virtual clothing, an initial position of each mesh vertex of the virtual clothing, a target position of each neighboring mesh vertex of each mesh vertex of the virtual clothing, and an initial position of each neighboring mesh vertex of each mesh vertex of the virtual clothing;

generating a wrinkle height field formed by the virtual clothing based on the compression ratio and the compression direction of each mesh vertex of the virtual clothing; and acquiring the normal direction of each position of the virtual clothing based on the wrinkle height field.

As a possible implementation of the embodiment of the present disclosure, acquiring a compression ratio and a compression direction of each mesh vertex of the virtual clothing, based on the target position of each mesh vertex of the virtual clothing, an initial position of each mesh vertex of the virtual clothing, a target position of each neighboring mesh vertex of each mesh vertex of the virtual clothing, and an initial position of each neighboring mesh vertex of each mesh vertex of the virtual clothing includes:

acquiring a first positional difference between each mesh vertex and each neighboring mesh vertex, the first positional difference between any mesh vertex and any neighboring mesh vertex is a difference between the target position of the neighboring mesh vertex and the target position of the mesh vertex;

acquiring a second positional difference between each mesh vertex and each neighboring mesh vertex, the second positional difference between any mesh vertex and any neighboring mesh vertex is a difference between the initial position of the neighboring mesh vertex and the initial position of the mesh vertex;

acquiring a first matrix corresponding to each neighboring mesh vertex of each mesh vertex, the first matrix corresponding to any neighboring mesh vertex of any mesh vertex is a tensor product of the first positional difference between the mesh vertex and the neighboring mesh vertex and the second positional difference between the mesh vertex and the neighboring mesh vertex;

acquiring a first feature matrix of each mesh vertex, the first feature matrix of any mesh vertex is a sum of first matrices corresponding to neighboring mesh vertexes of the mesh vertex;

acquiring a second matrix corresponding to each neighboring mesh vertex of each mesh vertex, the second matrix corresponding to any neighboring mesh vertex of any mesh vertex is a tensor product of the second positional difference between the mesh vertex and the neighboring mesh vertex and the second positional difference between the mesh vertex and the neighboring mesh vertex;

acquiring a second feature matrix of each mesh vertex, the second feature matrix of any mesh vertex is a sum of second matrices corresponding to neighboring mesh vertexes of the mesh vertex;

acquiring a third feature matrix of each mesh vertex, the third feature matrix of any mesh vertex is a product of the first feature matrix of the mesh vertex and an inverse matrix of the second feature matrix of the mesh vertex;

acquiring a fourth feature matrix of each mesh vertex, the fourth feature matrix of any mesh vertex is a product of a transposed matrix of the third feature matrix of the mesh vertex and the third feature matrix of the mesh vertex; and acquiring a minimum eigenvalue and an eigenvector of the fourth feature matrix of each mesh vertex, and using the minimum eigenvalue and the eigenvector as the compression ratio and the compression direction of each mesh vertex, respectively.

As a possible implementation of the embodiment of the present disclosure, generating a wrinkle height field formed by the virtual clothing based on the compression ratio and the compression direction of each mesh vertex of the virtual clothing includes:

acquiring a height value of each mesh vertex of the virtual clothing based on the compression ratio of each mesh vertex of the virtual clothing, the height value of any mesh vertex is a product of a first computed value corresponding to the mesh vertex and a first constant, and the first computed value corresponding to any mesh vertex is a difference between a second constant and the compression ratio of the mesh vertex;

acquiring an impact value of each position of the virtual clothing, the impact value of any position includes an impact value, on the position, of each mesh vertex of a mesh to which the position belongs, the impact value of any mesh vertex on any position includes a product of the height value of the mesh vertex and a corresponding height retention rate, the height retention rate of any position to any mesh vertex is a cosine of the compression direction of the mesh vertex and a corresponding positional difference, and the positional difference of any position to any mesh vertex is a positional difference of the position to the target position of the mesh vertex;

acquiring a height of each position of the virtual clothing based on the impact value of each position of the virtual clothing; and acquiring the wrinkle height field formed by the virtual clothing based on the height of each position of the virtual clothing.

As a possible implementation of the embodiment of the present disclosure, acquiring a normal direction of each position of the virtual clothing based on the wrinkle height field includes:

acquiring a gradient of each position of the virtual clothing based on the wrinkle height field; and acquiring the normal direction of each position of the virtual clothing by making a difference between an initial normal direction of each position of the virtual clothing and the gradient of each position of the virtual clothing.

As a possible implementation of the embodiment of the present disclosure, before acquiring a target position of each mesh vertex of virtual clothing based on the posture information, the method further includes:

merging mesh vertexes, having a same position, among the mesh vertexes of the virtual clothing to generate a virtual clothing with fully connected topology.

In a second aspect, an embodiment of the present disclosure provides an apparatus for rendering virtual clothing, including:

an acquisition unit, configured to acquire posture information of a target object;

a drive unit, configured to acquire a target position of each mesh vertex of the virtual clothing based on the posture information, the target position of each mesh vertex of the virtual clothing includes a position of each mesh vertex of the virtual clothing after the virtual clothing is deformed based on the posture information;

a processing unit, configured to acquire a normal direction of each position of the virtual clothing based on the target position of each mesh vertex of the virtual clothing;

a rendering unit, configured to render the virtual clothing based on the normal direction of each position of the virtual clothing and output a rendered effect image of the virtual clothing.

As a possible implementation of the embodiment of the present disclosure, the drive unit is specifically configured to acquire a bone transform matrix of the at least one bone in a skeleton model of the target object based on the posture information, and calculate to obtain a target position of each mesh vertex of the virtual clothing based on the bone transform matrix of the at least one bone and the skin information of the at least one bone;

the bone transform matrix of any bone is a matrix that transforms the bone from an initial position to a position corresponding to the posture information, and the skin information of any bone includes an impact weight of the bone on each mesh vertex of the virtual clothing.

As a possible implementation of the embodiment of the present disclosure, the drive unit is specifically configured to acquire an impact value of each bone of the at least one bone on each mesh vertex of the virtual clothing and sum the impact values of the at least one bone on a same mesh vertex of the virtual clothing to acquire the target position of each mesh vertex of the virtual clothing;

the impact value of any bone on any mesh vertex includes a product of the impact weight of the bone on the mesh vertex, the bone transform matrix of the bone, and the initial position of the mesh vertex.

As a possible implementation of the embodiment of the present disclosure, the apparatus further includes:

an extraction unit, configured to acquire a target image, and extract the skeleton model of the target object based on the target image before acquiring the bone transform matrix of the at least one bone in a skeleton model of the target object based on the posture information;

the target image includes the target object.

As a possible implementation of the embodiment of the present disclosure, the processing unit is specifically configured to acquire a compression ratio of each mesh vertex of the virtual clothing and a compression direction of each mesh vertex of the virtual clothing, based on the target position of each mesh vertex of the virtual clothing, an initial position of each mesh vertex of the virtual clothing, a target position of each neighboring mesh vertex of each mesh vertex of the virtual clothing, and an initial position of each neighboring mesh vertex of each mesh vertex of the virtual clothing; generate a wrinkle height field formed by the virtual clothing based on the compression ratio of each mesh vertex of the virtual clothing and the compression direction of each mesh vertex of the virtual clothing; and acquire a normal direction of each position of the virtual clothing based on the wrinkle height field.

As a possible implementation of the embodiment of the present disclosure, the processing unit is specifically configured to acquire a first positional difference between each mesh vertex and each neighboring mesh vertex, the first positional difference between any mesh vertex and any neighboring mesh vertex is a difference between the target position of the neighboring mesh vertex and the target position of the mesh vertex; acquire a second positional difference between each mesh vertex and each neighboring mesh vertex, the second positional difference between any mesh vertex and any neighboring mesh vertex is a difference between the initial position of the individual neighboring mesh vertex and the initial position of each mesh vertex; acquire a first matrix corresponding to each neighboring mesh vertex of each mesh vertex, the first matrix corresponding to any neighboring mesh vertex of any mesh vertex is a tensor product of the first positional difference and the second positional difference between the mesh vertex and the neighboring mesh vertex; acquire a first feature matrix of each mesh vertex, the first feature matrix of any mesh vertex is a sum of first matrices corresponding to various neighboring mesh vertexes of the mesh vertex; acquire a second matrix corresponding to each neighboring mesh vertex of each mesh vertex, the second matrix corresponding to any neighboring mesh vertex of any mesh vertex is a tensor product of the second positional difference between the mesh vertex and the neighboring mesh vertex and the second positional difference between the mesh vertex and the neighboring mesh vertex; acquire a second feature matrix of each mesh vertex, the second feature matrix of any mesh vertex is a sum of second matrices corresponding to various neighboring mesh vertexes of the mesh vertex; acquire a third feature matrix of each mesh vertex, the third feature matrix of any mesh vertex is a product of the first feature matrix of the mesh vertex and an inverse matrix of the second feature matrix of the mesh vertex; acquire a fourth feature matrix of each mesh vertex, the fourth feature matrix of any mesh vertex is a product of a transposed matrix of the third feature matrix of the mesh vertex and the third feature matrix of the mesh vertex; and acquire a minimum eigenvalue and an eigenvector of the fourth feature matrix of each mesh vertex, and use the minimum eigenvalue and the eigenvector as the compression ratio and the compression direction of each mesh vertex, respectively.

As a possible implementation of the embodiment of the present disclosure, the processing unit is specifically configured to acquire a height value of each mesh vertex of the virtual clothing based on the compression ratio of each mesh vertex of the virtual clothing, the height value of any mesh vertex is a product of a first computed value corresponding to the mesh vertex and a first constant, the first computed value corresponding to any mesh vertex is a difference between a second constant and the compression ratio of the mesh vertex; acquire an impact value of each position of the virtual clothing, the impact value of any position includes an impact value, on the position, of each mesh vertex of a mesh to which the position belongs, the impact value of any mesh vertex on any position includes a product of the height value of the mesh vertex and a corresponding height retention rate, the height retention rate of any position to any mesh vertex being a cosine of the compression direction of the mesh vertex and the corresponding positional difference, and the positional difference of any position to any mesh vertex is a positional difference of the position to the target position of the mesh vertex; acquire a height of each position of the virtual clothing based on the impact value of each position of the virtual clothing; and acquire the wrinkle height field formed by the virtual clothing based on the height of each position of the virtual clothing.

As a possible implementation of the embodiment of the present disclosure, the processing unit is specifically configured to acquire a gradient of each position of the virtual clothing based on the wrinkle height field; and acquire the normal direction of each position of the virtual clothing by making a difference between an initial normal direction of each position of the virtual clothing and the gradient of each position of the virtual clothing.

As a possible implementation of the embodiment of the present disclosure, the apparatus further includes:

a generation unit configured to merge mesh vertexes, having the same position, among the mesh vertexes of the virtual clothing to generate the virtual clothing with fully connected topology before the drive unit 62 acquires a target position of each mesh vertex of virtual clothing based on the posture information.

In a third aspect, an embodiment of the present disclosure provides an electronic device, including a memory and a processor, the memory is configured to store a computer program, the processor is configured to, when executing the computer program, cause the electronic device to implement the method for rendering virtual clothing of any one of the above embodiments.

In a fourth aspect, an embodiment of the present disclosure provides a computer-readable storage medium, the computer-readable storage medium stores a computer program which, when executed by a computing device, causing the computing device to implement the method for rendering virtual clothing of any one of the above embodiments.

In a fifth aspect, an embodiment of the present disclosure provides a computer program product, when run on a computer, the computer program product causing the computer to implement the method for rendering virtual clothing of any one of the above embodiments.

The method for rendering virtual clothing provided by the embodiments of the present disclosure, when used to perform virtual clothing rendering processing, includes first, acquiring posture information of a target object, then acquiring a target position of each mesh vertex of virtual clothing after the virtual clothing is deformed based on the posture information, acquiring a normal direction of each position of the virtual clothing based on the target position of each mesh vertex of the virtual clothing, and then rendering the virtual clothing based on the normal direction of each position of the virtual clothing and outputting a rendered effect image of the virtual clothing. On the one hand, according to the embodiments of the present disclosure, the normal direction of each position of the virtual clothing can be acquired, the virtual clothing is rendered based on the normal direction of each position of the virtual clothing, and the rendered effect image of the virtual clothing is output, the normal direction of each position may affect brightness of each position of the virtual clothing, so that shadows of wrinkles of the virtual clothing can be rendered in the rendered effect image of the virtual clothing according to the embodiments of the present disclosure, enabling the virtual clothing to produce a wrinkle effect as the user's posture changes, and thus making the virtual clothing more realistic. On the other hand, in the embodiments of the present disclosure, only the normal direction of each position of the virtual clothing is utilized to control the brightness of each position of the virtual clothing, and no actual wrinkles are generated, so that the amount of computation for rendering of the virtual clothing can be reduced according to the embodiments of the present disclosure. In summary, the embodiments of the present disclosure may reduce the amount of computation for rendering of the virtual clothing while enabling the virtual clothing to have a wrinkle effect as the user's posture changes.

BRIEF DESCRIPTION OF THE DRAWINGS

The accompanying drawings, which are incorporated in and constitute a part of the specification, illustrate embodiments consistent with the present disclosure and, together with the description, serve to explain the principles of the present disclosure.

To describe the technical solutions in the embodiments of the present disclosure or in the prior art more clearly, the following briefly describes the accompanying drawings required for the embodiments or the prior art. Apparently, persons of ordinary skill in the art may still derive other drawings from these accompanying drawings without creative efforts.

FIG. 1 is a flowchart of steps of a method for rendering virtual clothing according to an embodiment of the present disclosure;

FIG. 2 is a schematic diagram of a normal direction according to an embodiment of the present disclosure;

FIG. 3 is a flowchart steps of another method for rendering virtual clothing according to an embodiment of the present disclosure;

DETAILED DESCRIPTION

Figure 4:
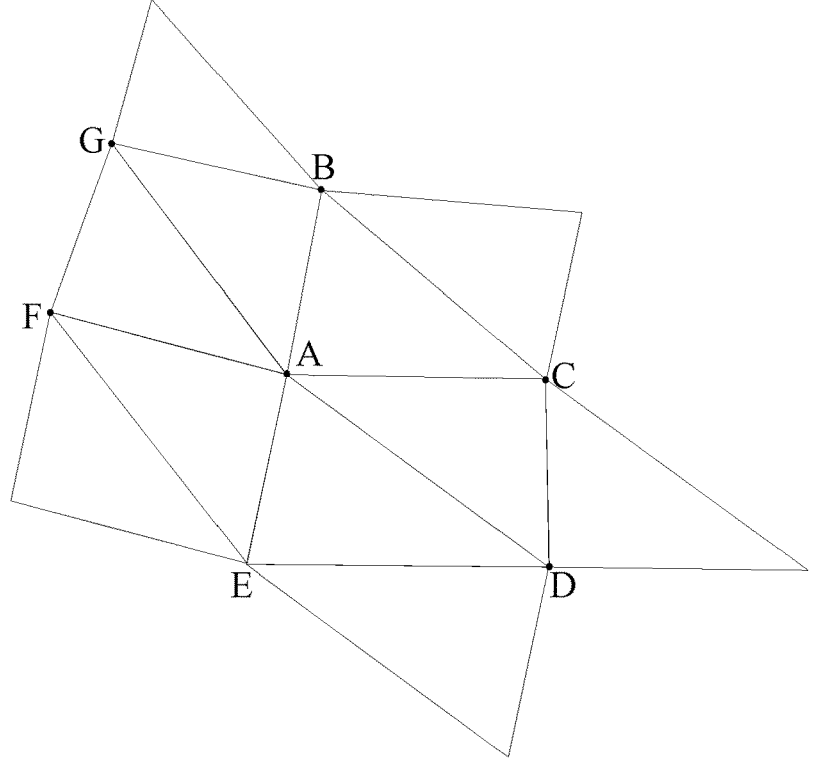
FIG. 4 is a schematic diagram of neighboring mesh vertexes according to an embodiment of the present disclosure.

To more clearly understand the foregoing objectives, features, and advantages in the present disclosure, the following further describes the solutions of the present disclosure. It should be noted that, without conflict, the embodiments and features in the embodiments of the present disclosure may be combined with each other.

The following illustrates many specific details for full understanding of the present disclosure, but the present disclosure may also be implemented in other ways than those described herein. Apparently, the described embodiments in the specification are only some rather than all of the embodiments of the present disclosure.

In the embodiments of the present disclosure, the terms such as "exemplary" or "for example" are used to indicate an example, illustration, or description. Any embodiment or design solution described as "exemplary" or "for example" in the embodiments of the present disclosure should not be construed as being preferred or advantageous over other embodiments or design solutions. Rather, the use of the terms such as "exemplary" or "for example" is intended to present the relevant concepts in a specific manner. Furthermore, in the description of the present disclosure, "a plurality of" means two or more than two, unless otherwise stated.

An embodiment of the present disclosure provides a method for rendering virtual clothing. With reference to FIG. 1, the method for rendering virtual clothing includes S11-S14.

S11: Acquire posture information of a target object.

In some example embodiments, an image of the target object may be acquired by an image acquisition device performing image acquisition on the target object, and the target object may be recognized in the acquired image to acquire posture information of the target object. For example, the posture information of the target object may include a head movement, an upper limb movement, a lower limb movement, and the like of the target object.

The target object in the embodiment of the present disclosure may include an object wearing virtual clothing in the generated virtual clothing rendered effect image. The target object may specifically include a person, an animal, a virtual model, a solid model, etc., and there is no limitation on the specific type of the target object in the embodiment of the present disclosure.

S12: Acquire a target position of each mesh vertex of virtual clothing based on the posture information.

The target position of each mesh vertex of the virtual clothing includes a position of each mesh vertex of the virtual clothing after the virtual clothing is deformed based on the posture information.

Specifically, the virtual clothing in the present disclosure may refer to a mesh model that approximates real clothing by employing a plurality of interconnected polygons (meshes), and mesh vertexes of the virtual clothing may refer to vertexes of the polygons in the mesh model that represents the real clothing. The polygons may include triangles, parallelograms, rectangles, etc., and there is no limitation on the mesh shape in the embodiment of the present disclosure.

In a possible implementation, the process of acquiring a target position of each mesh vertex of virtual clothing based on the posture information may include: first, transforming a posture of a skeleton model of the target object based on the posture information, acquiring position information of each bone of the skeleton model of the target object after the transformation based on the posture information, then driving the virtual clothing to transform based on the position information of each bone of the skeleton model of the target object after the transformation based on the posture information, so as to acquire the target position of each mesh vertex of the virtual clothing.

S13: Acquire a normal direction of each position of the virtual clothing based on the target position of each mesh vertex of the virtual clothing.

The direction normal to any position of the virtual clothing in the embodiment of the present disclosure is a direction perpendicular to a tangent plane of the position on the virtual clothing. For example, referring to FIG. 2, plane 22 is the tangent plane of point 211 of virtual clothing 21, direction F is a direction perpendicular to the plane 22, and thus the normal direction of the position of the point 211 of the virtual clothing 21 is F.

S14: Render the virtual clothing based on the normal direction of each position of the virtual clothing and output a rendered effect image of the virtual clothing.

Specifically, a normal map of the virtual clothing may be generated based on the normal direction of each position of the virtual clothing, and brightness variation of each position on the virtual clothing due to the angle between the normal direction and the direction of a light source may be calculated based on the normal map of the virtual clothing, so as to enable the surface of the virtual clothing to have a rendering effect with the distribution of wrinkle shadows.

The method for rendering virtual clothing provided by the embodiment of the present disclosure, when used to perform virtual clothing rendering processing, includes first, acquiring posture information of a target object, then acquiring a target position of each mesh vertex of virtual clothing after the virtual clothing is deformed based on the posture information, acquiring a normal direction of each position of the virtual clothing based on the target position of each mesh vertex of the virtual clothing, and then rendering the virtual clothing based on the normal direction of each position of the virtual clothing and outputting a rendered effect image of the virtual clothing. On the one hand, according to the embodiment of the present disclosure, the normal direction of each position of the virtual clothing can be acquired, the virtual clothing is rendered based on the normal direction of each position of the virtual clothing, and the rendered effect image of the virtual clothing is output, the normal direction of each position may affect the brightness of each position of the virtual clothing, so that shadows of wrinkles of the virtual clothing can be rendered in the rendered effect image of the virtual clothing according to the embodiment of the present disclosure, enabling the virtual clothing to produce a wrinkle effect as the user's posture changes, and thus making the virtual clothing more realistic. On the other hand, in the embodiment of the present disclosure, only the normal direction of each position of the virtual clothing is utilized to control the brightness of each position of the virtual clothing, and no actual wrinkles are generated, so that the amount of computation for rendering of the virtual clothing can be reduced according to the embodiment of the present disclosure. In summary, the embodiment of the present disclosure may reduce the amount of computation for rendering of the virtual clothing while enabling the virtual clothing to have a wrinkle effect as the user's posture changes.

As an extension and detail of the above embodiment, an embodiment of the present disclosure provides another method for rendering virtual clothing. With reference to FIG. 3, the method for rendering virtual clothing includes S301-S310.

S301: Acquire a target image.

The target image includes a target object.

That is, the target object is subjected to image sampling to acquire the target image including the target object. The image may be a flat image, or a depth image containing depth information.

S302: Extract a skeleton model of the target object based on the target image.

Specifically, the implementation of extracting a skeleton model of the target object based on the target image may include: first, acquiring a pre-built skeleton model based on the type of the target object, and then modifying the pre-built skeleton model based on position information of each key point of the target object so as to acquire the skeleton model of the target object. For example, if the target object is a human being, the pre-built human skeleton model is acquired first, and then information such as the length and number of each bone in the pre-built human skeleton model is modified based on the position information of each key point of the target object (elbow, wrist, knee, shoulder, etc.) so as to acquire the skeleton model of the target object.

In order to realize rendering of the virtual clothing, after the skeleton model of the target object is acquired, it is also necessary to generate the virtual clothing. The generation of the virtual clothing can be realized in the embodiment of the present invention by the following step S303.

S303: Merge mesh vertexes, having the same position, among the mesh vertexes of the virtual clothing to generate the virtual clothing with fully connected topology.

Specifically, the virtual clothing may be a 3D mesh model composed of a plurality of polygons. The plurality of polygons are independent of each other, and a plurality of vertexes of the plurality of polygons are located at the same position, and for the convenience of subsequent processing, the mesh vertexes having the same position may be merged to generate the virtual clothing with fully connected topology.

It should be noted that the embodiment of the present disclosure does not limit the sequence of extracting the skeleton model of the target object (steps S301 and S302) and generating the virtual clothing with fully connected typology (step S303). The virtual clothing with fully connected typology may be generated after the skeleton model of the target object is extracted, or the virtual clothing with fully connected typology may be generated before the skeleton model of the target object is extracted, or both may be performed simultaneously.

S304: Acquire posture information of the target object.

As described above, an image of the target object may be acquired by an image acquisition device performing image acquisition on the target object, and the target object may be recognized in the acquired image so as to acquire posture information of the target object.

S305: Acquire a bone transform matrix (Transform Matrix) of at least one bone in the skeleton model of the target object based on the posture information.

The bone transform matrix of any bone is a matrix that transforms the bone from an initial position to a position corresponding to the posture information.

Specifically, the position and orientation of each bone in the skeleton model extracted in step S302 may be updated based on the posture information, so as to acquire the bone transform matrix of the at least one bone in the skeleton model of the target object.

S306: Calculate to obtain the target position of each mesh vertex of the virtual clothing based on the bone transform matrix of the at least one bone and skin information of the at least one bone.

The skin information of any bone includes an impact weight of the bone on each mesh vertex of the virtual clothing.

Specifically, each mesh vertex of the virtual clothing may be bound to at least one bone in the skeleton model of the target object, and the impact weight of the bone on each mesh vertex may be configured, so that the skin information for the at least one bone in the skeleton model is generated. In the embodiment of the present disclosure, the virtual clothing may be bound to individual bones in the skeleton model of the target object.

In a possible implementation, the implementation of calculating to obtain a target position of each mesh vertex of the virtual clothing based on the bone transform matrix of the at least one bone and skin information of the at least one bone includes the following steps 306a and 306b.

Step S306a: Acquire an impact value of each bone of the at least one bone on each mesh vertex of the virtual clothing.

The impact value of any bone on any mesh vertex includes a product of the impact weight of the bone on the mesh vertex, the bone transform matrix of the bone, and an initial position of the mesh vertex.

Let the bone transform matrix of bone k be $T_k$, the impact weight of the bone k on the mesh vertex i be $$w_i^k,$$

the initial position of the mesh vertex i be $$x_i^0,$$

and the impact value of the bone k to the mesh vertex i be $$x_i^k,$$

then:

$$x_i^k = w_i^k T_k x_i^0$$

Step 306b: Sum the impact values of the at least one bone on a same mesh vertex of the virtual clothing to acquire the target position of each mesh vertex of the virtual clothing.

Let the target position of the mesh vertex i be $x_i$, and the at least one bone include n bones, then:

$$x_i = w_i^1 T_1 x_i^0 + w_i^2 T_2 x_i^0 + \cdots + w_i^n T_n x_i^0 = \sum_{k=1}^{n} w_i^k T_k x_i^0$$

S307: Acquire a compression ratio of each mesh vertex of the virtual clothing and a compression direction of each mesh vertex of the virtual clothing, based on the target position of each mesh vertex of the virtual clothing, an initial position of each mesh vertex of the virtual clothing, a target position of each neighboring mesh vertex of each mesh vertex of the virtual clothing, and an initial position of each neighboring mesh vertex of each mesh vertex of the virtual clothing.

Specifically, a neighboring mesh vertex of any mesh vertex in the embodiment of the present disclosure is a mesh vertex belonging to the same mesh as that mesh vertex. Alternatively, for any two mesh vertexes, if the two mesh vertexes have interconnecting mesh lines therebetween, then the two mesh vertexes are neighboring mesh vertexes to each other. If the two mesh vertexes do not have interconnecting mesh lines therebetween, then the two mesh vertexes are not neighboring mesh vertexes. With reference to FIG. 4, mesh vertexes belonging to the same mesh as mesh vertex A (i.e., having interconnecting mesh lines with the mesh vertex A) include: mesh vertex B, mesh vertex C, mesh vertex D, mesh vertex E, mesh vertex F, and mesh vertex G. Therefore, the neighboring mesh vertexes of the mesh vertex A include: mesh vertex B, mesh vertex C, mesh vertex D, mesh vertex E, mesh vertex F, and mesh vertex G.

In the embodiment of the present disclosure, each neighboring mesh vertex of each mesh vertex may be acquired in advance and the index of each neighboring mesh vertex of each mesh vertex is stored to a preset position in the above step S303 (generate the virtual clothing with fully connected topology), so that the neighboring mesh vertexes of the mesh vertex may be read directly in step S307.

Further, the compression ratio of any of the mesh vertexes is used to represent a ratio of the average area of the mesh using the mesh vertex as a vertex before and after deformation of the virtual clothing.

For example, with reference to FIG. 4, meshes of the virtual clothing are shown in FIG. 4 as an example of triangles, and meshes with the mesh vertex A as a vertex include: △ABC, △ACD, △ADE, △AEF, △AFG, and △AGB; before the virtual clothing is deformed, the average area of the meshes of △ABC, △ACD, △ADE, △AEF, △AFG, and △AGB is: $S_{11}$, $S_{12}$, $S_{13}$, $S_{14}$, $S_{15}$, and $S_{16}$ respectively, and after the virtual clothing is deformed, the average area of the meshes of △ABC, △ACD, △ADE, △AEF, △AFG, and △AGB is $S_{21}$, $S_{22}$, $S_{23}$, $S_{24}$, $S_{25}$, and $S_{26}$ respectively; then the compression ratio Cr of the mesh vertex A may be represented by a result of the following equation:

$$Cr = (S_{21} + S_{22} + S_{23} + S_{24} + S_{25} + S_{26})/(S_{11} + S_{12} + S_{13} + S_{14} + S_{15} + S_{16})$$

In a possible implementation, the above step S307 (acquire a compression ratio of each mesh vertex of the virtual clothing and a compression direction of each mesh vertex of the virtual clothing, based on the target position of each mesh vertex of the virtual clothing, an initial position of each mesh vertex of the virtual clothing, a target position of each neighboring mesh vertex of each mesh vertex of the virtual clothing, and an initial position of each neighboring mesh vertex of each mesh vertex of the virtual clothing) may include the following steps 307*a* to 307*i*.

Step 307*a*. Acquire a first positional difference between each mesh vertex and each neighboring mesh vertex.

The first positional difference between any mesh vertex and any neighboring mesh vertex is a difference between the target position of the neighboring mesh vertex and the target position of the mesh vertex.

Let the target position of a mesh vertex j be $x_j$, the target position of a neighboring mesh vertex n of the mesh vertex j be $x_n$, and the first positional difference between the mesh vertex j and the neighboring mesh vertex n of the mesh vertex j be $e_{jn}$, then:

$$e_{jn} = x_{jn} - x_j$$

Step 307*b*: Acquire a second positional difference between each mesh vertex and each neighboring mesh vertex.

The second positional difference between any mesh vertex and any neighboring mesh vertex is a difference between the initial position of the neighboring mesh vertex and the initial position of the mesh vertex.

Let the initial position of the mesh vertex j be $$x_j^0,$$

the target position of the neighboring mesh vertex n of the mesh vertex j be $$x_n^0,$$

and the second positional difference between the mesh vertex j and the neighboring mesh vertex n of the mesh vertex j be $$e_{jn}^0,$$

then:

$$e_{jn}^0 = x_{jn}^0 - x_j^0$$

Step 307*c*: Acquire a first matrix corresponding to each neighboring mesh vertex of each mesh vertex.

The first matrix corresponding to any neighboring mesh vertex of any mesh vertex is a tensor product of the first positional difference between the mesh vertex and the neighboring mesh vertex and the second positional difference between the mesh vertex and the neighboring mesh vertex.

Let the first matrix corresponding to the neighboring mesh vertex n of the mesh vertex j be $P_{jn}$, then:

$$P_{jn} = e_{jn} \otimes e_{jn}^0 = (x_{jn} - x_j) \otimes (x_{jn}^0 - x_j^0)$$

Step 307*d*: Acquire a first feature matrix of each mesh vertex.

The first feature matrix of any mesh vertex is a sum of first matrices corresponding to neighboring mesh vertexes of the mesh vertex.

Let the mesh vertex j have a total of m neighboring mesh vertexes, and the first feature matrix of the mesh vertex j be $Q_j$, then:

$$Q_j = P_{j1} + P_{j2} + \cdots + P_{jm} = \sum_{n=1}^{m} e_{jn} \otimes e_{jn}^0$$

Step 307*e*: Acquire a second matrix corresponding to each neighboring mesh vertex of each mesh vertex.

The second matrix corresponding to any neighboring mesh vertex of any mesh vertex is a tensor product of the second positional difference between the mesh vertex and the neighboring mesh vertex and the second positional difference between the mesh vertex and the neighboring mesh vertex.

Let the second matrix corresponding to the neighboring mesh vertex n of the mesh vertex j be $X_{jn}$, then:

$$X_{jn} = e_{jn}^0 \otimes e_{jn}^0 = (x_{jn}^0 - x_j^0) \otimes (x_{jn}^0 - x_j^0)$$

Step 307*f*: Acquire a second feature matrix of each mesh vertex.

The second feature matrix of any mesh vertex is a sum of second matrices corresponding to neighboring mesh vertexes of the mesh vertex.

Let the mesh vertex j have a total of m neighboring mesh vertexes, and the second feature matrix of the mesh vertex j be $Y_j$, then $$Y_j = X_{j1} + X_{j2} + \cdots + X_{jm} = \sum_{n=1}^{m} e_{jn}^0 \otimes e_{jn}^0$$

Step 307*g*: Acquire a third feature matrix of each mesh vertex.

The third feature matrix of any mesh vertex is a product of the first feature matrix of the mesh vertex and an inverse matrix of the second feature matrix of the mesh vertex.

Let the third feature matrix of the mesh vertex j be $M_j$, then:

$$M_j = Q_j Y_j^{-1} = \left( \sum_{n=1}^{m} e_{jn} \otimes e_{jn}^0 \right) \left( \sum_{n=1}^{m} e_{jn}^0 \otimes e_{jn}^0 \right)^{-1}$$

Step 307*h*: Acquire a fourth feature matrix of each mesh vertex.

The fourth feature matrix of any mesh vertex is a product of a transposed matrix of the third feature matrix of the mesh vertex and the third feature matrix of the mesh vertex.

Let the third feature matrix of the mesh vertex j be $A_j$, then:

$$A_j = M_j^T M_j$$

Step 307*i*: Acquire a minimum eigenvalue of the fourth feature matrix of each mesh vertex and an eigenvector of the fourth feature matrix of each mesh vertex, and use the minimum eigenvalue and the eigenvector as the compression ratio and the compression direction of each mesh vertex, respectively.

That is, the minimum eigenvalue of the second matrix corresponding to each mesh vertex is acquired as the compression ratio corresponding to each mesh vertex, and the eigenvector corresponding to the minimum eigenvalue of the second matrix corresponding to each mesh vertex is acquired as the compression direction corresponding to each mesh vertex.

S308: Generate a wrinkle height field formed by the virtual clothing based on the compression ratio of each mesh vertex of the virtual clothing and the compression direction of each mesh vertex of the virtual clothing.

In a possible implementation, the above step S308 (generate a wrinkle height field formed by the virtual clothing based on the compression ratio of each mesh vertex of the virtual clothing and the compression direction of each mesh vertex of the virtual clothing) may include the following steps 308*a* to 308*d*.

Step 308*a*: Acquire a height value of each mesh vertex of the virtual clothing based on the compression ratio of each mesh vertex of the virtual clothing.

The height value of any mesh vertex is a product of a first computed value corresponding to the mesh vertex and a first constant, the first computed value corresponding to any mesh vertex is a difference between a second constant and the compression ratio of the mesh vertex.

Let the compression ratio of a mesh vertex k be $c_k$, the first constant be a, the second constant be b, the first computed value corresponding to the mesh vertex k be $l_k$, and the height value of the mesh vertex k be $h_k$, then:

$$h_k = al_k = a(b - c_k)$$

For example, the second constant may be 1.

Step 308*b*: Acquire an impact value of each position of the virtual clothing.

The impact value of any position includes an impact value, on the position, of each mesh vertex of a mesh to which the position belongs, the impact value of any mesh vertex on any position includes a product of the height value of the mesh vertex and a corresponding height retention rate, the height retention rate of any position to any mesh vertex is a cosine of the compression direction of the mesh vertex and the corresponding positional difference, and the positional difference of any position to any mesh vertex is a positional difference of the position to the target position of the mesh vertex.

Let the compression direction of the mesh vertex k be $d_k$, the position coordinates of position q be Y, the target position of the mesh vertex k be $x_k$, and the height retention rate of position D to the mesh vertex k be, then:

$$H_{kq} = \cos[d_k \cdot (Y - x_k)]$$

For example, the following is an illustration of the implementation of the above step 308*b* using the example of each mesh of the virtual clothing being a triangular mesh and acquiring the impact value of the position D located within the triangular mesh ABC. Since the impact value of any position includes the impact value, on the position, of each mesh vertex of the mesh to which the position belongs, the impact value of the position D includes the impact value of the mesh vertex A on the position D, the impact value of the mesh vertex B on the position D, and the impact value of the mesh vertex C on the position D.

Let the position coordinates of the position D be Y, the impact value of the mesh vertex A on the position D be $H_{AD}$, the impact value of the mesh vertex B on the position D be $H_{BD}$, the impact value of the mesh vertex C on the position D be $H_{CD}$, the value of height of the mesh vertex A be $h_A$, the value of height of the mesh vertex B be $h_B$, the value of height of the mesh vertex C be $h_C$, the compression direction of the mesh vertex A be $d_A$, the compression direction of the mesh vertex B be $d_B$, the compression direction of the mesh vertex C be $d_C$, the target position of the mesh vertex A be $x_A$, the target position of the mesh vertex B be $x_B$, and the target position of the mesh vertex C be $x_C$, then:

$$H_{AD} = h_A * \cos[d_A \cdot (Y - x_A)]$$
$$H_{BD} = h_B * \cos[d_B \cdot (Y - x_B)]$$
$$H_{CD} = h_D * \cos[d_C \cdot (Y - x_C)]$$

Step 308*c*: Acquire a height of each position of the virtual clothing based on the impact value of each position of the virtual clothing.

As the above, the height of position D of the virtual clothing is acquired based on $H_{AD}$, $H_{BD}$ and $H_{CD}$.

For example, acquire a height of each position of the virtual clothing based on the impact value of each position of the virtual clothing may include: acquire the height of each position of the virtual clothing by linearly differing the impact value of relative position of each position in the mesh on the mesh vertex.

Step 308*d*: Acquire a wrinkle height field formed by the virtual clothing based on the height of each position on the virtual clothing.

S309: Acquire a normal direction of each position of the virtual clothing based on the wrinkle height field.

In a possible implementation, the step S309 (acquire a normal direction of each position of the virtual clothing based on the wrinkle height field) includes the following steps S309*a* and S309*b*.

Step S309*a*: Acquire a gradient of each position of the virtual clothing based on the wrinkle height field.

Let the position coordinates of position Y be y, the height of the position Y be H(y), and the gradient of the position Y be $H_Y$, then:

$$H_Y = \frac{\partial H(y)}{\partial y}$$

Step S309$b$: Acquire the normal direction of each position of the virtual clothing by making a difference between an initial normal direction of each position of the virtual clothing and the gradient of each position of the virtual clothing.

Let the initial normal direction of the position Y be $$N_Y^0,$$

and the normal direction of the position Y be $N_Y$, then:

$$N_Y = N_Y^0 - H_Y = N_Y^0 - \frac{\partial H(y)}{\partial y}$$

Figure 5:
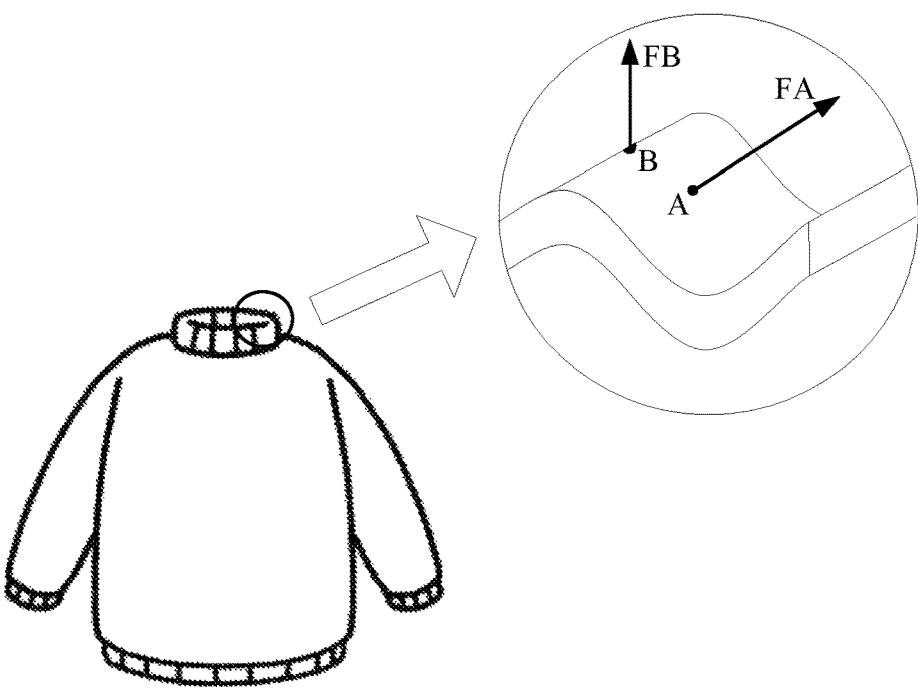
FIG. 5 is a schematic diagram of normal directions of positions of virtual clothing according to an embodiment of the present disclosure.

Specifically, the direction normal to any position of the virtual clothing is a direction perpendicular to the tangent plane at the position. For example, as shown in FIG. 5, a direction perpendicular to the tangent plane of position A of the virtual clothing is FA, and a direction perpendicular to the tangent plane of position B of the virtual clothing is FB, so that the normal direction of the position A of the virtual clothing is FA, and the normal direction of the position B of the virtual clothing is FB.

S310: Render the virtual clothing based on the normal direction of each position of the virtual clothing and outputting a rendered effect image of the virtual clothing.

The method for rendering virtual clothing provided by the embodiment of the present disclosure, when used to perform virtual clothing rendering processing, includes first, acquiring posture information of a target object, then acquiring a target position of each mesh vertex of virtual clothing after the virtual clothing is deformed based on the posture information, acquiring a normal direction of each position of the virtual clothing based on the target position of each mesh vertex of the virtual clothing, and then rendering the virtual clothing based on the normal direction of each position of the virtual clothing and outputting a rendered effect image of the virtual clothing. On the one hand, according to the embodiment of the present disclosure, the normal direction of each position of the virtual clothing can be acquired, the virtual clothing is rendered based on the normal direction of each position of the virtual clothing, and the rendered effect image of the virtual clothing is output, the normal direction of each position may affect the brightness of each position of the virtual clothing, so that shadows of wrinkles of the virtual clothing can be rendered in the rendered effect image of the virtual clothing according to the embodiment of the present disclosure, enabling the virtual clothing to produce a wrinkle effect as the user's posture changes, and thus making the virtual clothing more realistic. On the other hand, in the embodiment of the present disclosure, only the normal direction of each position of the virtual clothing is utilized to control the brightness of each position of the virtual clothing, and no actual wrinkles are generated, so that the amount of computation for rendering of the virtual clothing can be reduced according to the embodiment of the present disclosure. In summary, the embodiment of the present disclosure may reduce the amount of computation for rendering of the virtual clothing while enabling the virtual clothing to have a wrinkle effect as the user's posture changes.

Based on the same inventive conception, as an implementation of the foregoing methods, an embodiment of the present disclosure further provides an apparatus for rendering virtual clothing. The embodiment of the apparatus corresponds to the foregoing embodiment of the method. For ease of reading, the embodiment of the apparatus will not repeat the details of the foregoing embodiment of the method one by one. However, it should be clear that the apparatus for rendering virtual clothing in the embodiment can correspondingly implement all the contents in the foregoing embodiments of the method.

Figure 6:
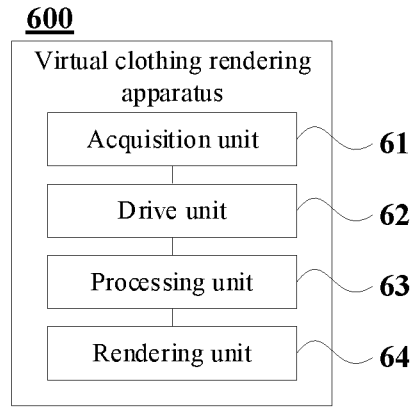
FIG. 6 is a schematic structural diagram of an apparatus for rendering virtual clothing according to an embodiment of the present disclosure.

An embodiment of the present disclosure provides an apparatus for rendering virtual clothing. FIG. 6 is a schematic structural diagram of the apparatus for rendering virtual clothing. As shown in FIG. 6, the apparatus for rendering virtual clothing 600 includes:

an acquisition unit 61, configured to acquire posture information of a target object;

a drive unit 62, configured to acquire a target position of each mesh vertex of the virtual clothing based on the posture information, the target position of each mesh vertex of the virtual clothing including a position of each mesh vertex of the virtual clothing after the virtual clothing is deformed based on the posture information;

a processing unit 63, configured to acquire a normal direction of each position of the virtual clothing based on the target position of each mesh vertex of the virtual clothing; and a rendering unit 64, configured to render the virtual clothing based on the normal direction of each position of the virtual clothing and output a rendered effect image of the virtual clothing.

As a possible implementation of the embodiment of the present disclosure, the drive unit 62 is specifically configured to acquire a bone transform matrix of the at least one bone in a skeleton model of the target object based on the posture information, and calculate to obtain a target position of each mesh vertex of the virtual clothing based on the bone transform matrix of the at least one bone and the skin information of the at least one bone.

The bone transform matrix of any bone is a matrix that transforms the bone from an initial position to a position corresponding to the posture information, and the skin information of any bone includes an impact weight of the bone on each mesh vertex of the virtual clothing.

As a possible implementation of the embodiment of the present disclosure, the drive unit 62 is specifically configured to acquire an impact value of each bone of the at least one bone on each mesh vertex of the virtual clothing and sum the impact values of the at least one bone on a same mesh vertex of the virtual clothing to acquire the target position of each mesh vertex of the virtual clothing.

The impact value of any bone on any mesh vertex includes a product of the impact weight of the bone on the mesh vertex, the bone transform matrix of the bone, and the initial position of the mesh vertex.

Figure 7:
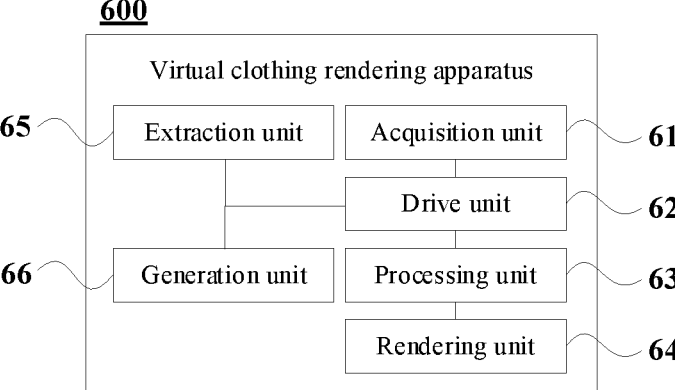
FIG. 7 is a schematic structural diagram of another apparatus for rendering virtual clothing according to an embodiment of the present disclosure.

As a possible implementation of the embodiment of the present disclosure, with reference to FIG. 7, the apparatus for rendering virtual clothing 600 further includes:

an extraction unit 65, configured to acquire a target image, and extract the skeleton model of the target object based on the target image before acquiring the bone transform matrix of the at least one bone in a skeleton model of the target object based on the posture information;

the target image includes the target object.

As a possible implementation of the embodiment of the present disclosure, the processing unit 63 is specifically configured to acquire a compression ratio of each mesh vertex of the virtual clothing and a compression direction of each mesh vertex of the virtual clothing, based on the target position of each mesh vertex of the virtual clothing, an initial position of each mesh vertex of the virtual clothing, a target position of each neighboring mesh vertex of each mesh vertex of the virtual clothing, and an initial position of each neighboring mesh vertex of each mesh vertex of the virtual clothing; generate a wrinkle height field formed by the virtual clothing based on the compression ratio of each mesh vertex of the virtual clothing and the compression direction of each mesh vertex of the virtual clothing; and acquire a normal direction of each position of the virtual clothing based on the wrinkle height field.

As a possible implementation of the embodiment of the present disclosure, the processing unit 63 is specifically configured to acquire a first positional difference between each mesh vertex and each neighboring mesh vertex, the first positional difference between any mesh vertex and any neighboring mesh vertex is a difference between the target position of the neighboring mesh vertex and the target position of the mesh vertex; acquire a second positional difference between each mesh vertex and each neighboring mesh vertex, the second positional difference between any mesh vertex and any neighboring mesh vertex is a difference between the initial position of the individual neighboring mesh vertex and the initial position of each mesh vertex; acquire a first matrix corresponding to each neighboring mesh vertex of each mesh vertex, the first matrix corresponding to any neighboring mesh vertex of any mesh vertex is a tensor product of the first positional difference and the second positional difference between the mesh vertex and the neighboring mesh vertex; acquire a first feature matrix of each mesh vertex, the first feature matrix of any mesh vertex is a sum of first matrices corresponding to various neighboring mesh vertexes of the mesh vertex; acquire a second matrix corresponding to each neighboring mesh vertex of each mesh vertex, the second matrix corresponding to any neighboring mesh vertex of any mesh vertex is a tensor product of the second positional difference between the mesh vertex and the neighboring mesh vertex and the second positional difference between the mesh vertex and the neighboring mesh vertex; acquire a second feature matrix of each mesh vertex, the second feature matrix of any mesh vertex is a sum of second matrices corresponding to various neighboring mesh vertexes of the mesh vertex; acquire a third feature matrix of each mesh vertex, the third feature matrix of any mesh vertex is a product of the first feature matrix of the mesh vertex and an inverse matrix of the second feature matrix of the mesh vertex; acquire a fourth feature matrix of each mesh vertex, the fourth feature matrix of any mesh vertex is a product of a transposed matrix of the third feature matrix of the mesh vertex and the third feature matrix of the mesh vertex; and acquire a minimum eigenvalue and an eigenvector of the fourth feature matrix of each mesh vertex, and use the minimum eigenvalue and the eigenvector as the compression ratio and the compression direction of each mesh vertex, respectively.

As a possible implementation of the embodiment of the present disclosure, the processing unit 63 is specifically configured to acquire a height value of each mesh vertex of the virtual clothing based on the compression ratio of each mesh vertex of the virtual clothing, the height value of any mesh vertex is a product of a first computed value corresponding to the mesh vertex and a first constant, the first computed value corresponding to any mesh vertex is a difference between a second constant and the compression ratio of the mesh vertex; acquire an impact value of each position of the virtual clothing, the impact value of any position includes an impact value, on the position, of each mesh vertex of a mesh to which the position belongs, the impact value of any mesh vertex on any position includes a product of the height value of the mesh vertex and a corresponding height retention rate, the height retention rate of any position to any mesh vertex being a cosine of the compression direction of the mesh vertex and the corresponding positional difference, and the positional difference of any position to any mesh vertex is a positional difference of the position to the target position of the mesh vertex; acquire a height of each position of the virtual clothing based on the impact value of each position of the virtual clothing; and acquire the wrinkle height field formed by the virtual clothing based on the height of each position of the virtual clothing.

As a possible implementation of the embodiment of the present disclosure, the processing unit 63 is specifically configured to acquire a gradient of each position of the virtual clothing based on the wrinkle height field; and acquire the normal direction of each position of the virtual clothing by making a difference between an initial normal direction of each position of the virtual clothing and the gradient of each position of the virtual clothing.

As a possible implementation of the embodiment of the present disclosure, with reference to FIG. 7, the apparatus for rendering virtual clothing 600 further includes:

a generation unit 66, configured to merge mesh vertexes, having the same position, among the mesh vertexes of the virtual clothing to generate the virtual clothing with fully connected topology before the drive unit 62 acquires a target position of each mesh vertex of virtual clothing based on the posture information.

The apparatus for rendering virtual clothing provided in the embodiment of the present disclosure can perform all of the contents of the method for rendering virtual clothing provided in the foregoing embodiments, and can achieve technical effects similar to those of the method for rendering virtual clothing described above.

Figure 8:
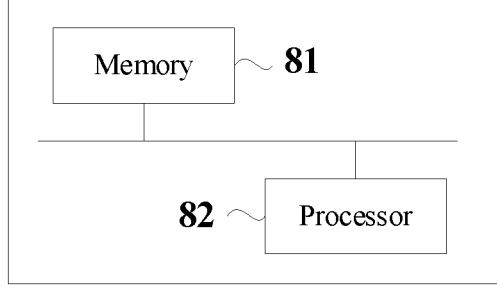
FIG. 8 is a schematic structural diagram of hardware of an electronic device according to an embodiment of the present disclosure.

Based on the same inventive concept, an embodiment of the present disclosure further provides an electric apparatus. FIG. 8 is a schematic structural diagram of an electronic device according to an embodiment of the present disclosure. As shown in FIG. 8, the electronic device provided in the embodiment includes a memory 81 and a processor 82, the memory 81 is configured to store a computer program, and the processor 82 is configured to, when executing the computer program, cause the electronic device to implement the method for rendering virtual clothing of the foregoing embodiments.

An embodiment of the present disclosure further provides a computer-readable storage medium, the computer-readable storage medium stores a computer program which, when executed by a computing device, causing the computing device to implement the method for rendering virtual clothing provided in the foregoing embodiments.

An embodiment of the present disclosure further provides a computer program product, when run on a computer, the computer program product causing the computer to implement the method for rendering virtual clothing provided in the foregoing embodiments.

It should be appreciated by those skilled in the art that the embodiments of the present disclosure may be provided as methods, systems, or computer program products. Accordingly, the present disclosure may employ the form of fully hardware embodiments, fully software embodiments, or embodiments combining software and hardware aspects. Furthermore, the present disclosure may be in the form of a computer program product implemented on one or more computer-usable storage media including computer usable program codes.

The processor may be a central processing unit (Central Processing Unit, CPU), or other general-purpose processor, a digital signal processor (Digital Signal Processor, DSP), a special-purpose integrated circuit (Application Specific Integrated Circuit, ASIC), a field-programmable gate array (Field-Programmable Gate Array, FPGA) or other programmable logic device, a discrete gate or transistor logic device, or a discrete hardware component, etc. The general-purpose processor may be a microprocessor, or the processor may also be any conventional processor or the like.

The memory may include forms such as a non-permanent memory, a random access memory (RAM) and/or a non-volatile memory in the computer readable medium, for example, a read-only memory (ROM) or a flash memory (flash RAM). The memory is an example of the computer-readable medium.

The computer-readable medium includes permanent and non-permanent, removable and non-removable storage media. The storage media may be used by any method or technology to implement information storage. The information may be computer-readable instructions, data structures, program modules, or other data. Examples of the storage media for computers include, but are not limited to, a phase-change memory (PRAM), a static random-access memory (SRAM), a dynamic random-access memory (DRAM), other type of random-access memory (RAM), a read-only memory (ROM), an electrically erasable programmable read-only memory (EEPROM), a flash memory or other memory technology, a read-only CD-ROM, a digital versatile disc (DVD) or other optical storage, a magnetic cartridge tape, disk storage or other magnetic storage devices or any other non-transfer media, which can be used to store information that can be accessed by the computing device. As defined herein, the computer-readable medium does not include computer-readable transitory media, such as modulated data signals and carriers.

Finally, it should be noted that the foregoing embodiments are only used to illustrate the technical solutions of the present disclosure, and are not intended to limit the present disclosure. Although the present disclosure has been described in detail with reference to the foregoing embodiments, persons of ordinary skill in the art should understand that the technical solutions recorded in the foregoing embodiments can still be modified, or some of the technical features thereof may be equivalently replaced. These modifications or replacements do not cause the essence of the corresponding technical solutions to deviate from the spirit and scope of the technical solutions of the embodiments of the present disclosure.

What is claimed is:

1. A method for rendering virtual clothing, comprising:
acquiring posture information of a target object;
acquiring a target position of each mesh vertex of the virtual clothing based on the posture information, the target position of each mesh vertex of the virtual clothing comprises a position of each mesh vertex of the virtual clothing after the virtual clothing is deformed based on the posture information;
acquiring a normal direction of each position of the virtual clothing based on the target position of each mesh vertex of the virtual clothing; and rendering the virtual clothing based on the normal direction of each position of the virtual clothing and outputting a rendered effect image of the virtual clothing,
wherein acquiring the normal direction of each position of the virtual clothing based on the target position of each mesh vertex of the virtual clothing comprises:
generating a wrinkle height field formed by the virtual clothing, and
acquiring the normal direction of each position of the virtual clothing based on the wrinkle height field;
wherein acquiring the normal direction of each position of the virtual clothing based on the wrinkle height field comprises:
acquiring a gradient of each position of the virtual clothing based on the wrinkle height field; and
acquiring the normal direction of each position of the virtual clothing by making a difference between an initial normal direction of each position of the virtual clothing and the gradient of each position of the virtual clothing.

2. The method according to claim 1, wherein acquiring the target position of each mesh vertex of the virtual clothing based on the posture information comprises:
acquiring a bone transform matrix of at least one bone in a skeleton model of the target object based on the posture information, the bone transform matrix of any bone is a matrix that transforms the bone from an initial position to a position corresponding to the posture information; and
calculating to obtain the target position of each mesh vertex of the virtual clothing based on the bone transform matrix of the at least one bone and skin information of the at least one bone; wherein the skin information of any bone comprises an impact weight of the bone on each mesh vertex of the virtual clothing.

3. The method according to claim 2, wherein calculating to obtain the target position of each mesh vertex of the virtual clothing based on the bone transform matrix of the at least one bone and the skin information of the at least one bone comprises:
acquiring an impact value of each bone of the at least one bone on each mesh vertex of the virtual clothing, the impact value of any bone on any mesh vertex comprises a product of the impact weight of the bone on the mesh vertex, the bone transform matrix of the bone, and an initial position of the mesh vertex; and
summing impact values of the at least one bone on a same mesh vertex of the virtual clothing to acquire the target position of each mesh vertex of the virtual clothing.

4. The method according to claim 2, wherein before acquiring the bone transform matrix of the at least one bone in the skeleton model of the target object based on the posture information, the method further comprises:
acquiring a target image, the target image comprises the target object; and
extracting the skeleton model of the target object based on the target image.

5. The method according to claim 1, wherein before generating the wrinkle height field formed by the virtual clothing, acquiring the normal direction of each position of the virtual clothing based on the target position of each mesh vertex of the virtual clothing further comprises:
acquiring a compression ratio and a compression direction of each mesh vertex of the virtual clothing based on the target position of each mesh vertex of the virtual clothing, an initial position of each mesh vertex of the virtual clothing, a target position of each neighboring mesh vertex of each mesh vertex of the virtual clothing, and an initial position of each neighboring mesh vertex of each mesh vertex of the virtual clothing;

wherein generating the wrinkle height field formed by the virtual clothing comprises:

generating the wrinkle height field formed by the virtual clothing based on the compression ratio and the compression direction of each mesh vertex of the virtual clothing.

6. The method according to claim 5, wherein acquiring the compression ratio and the compression direction of each mesh vertex of the virtual clothing, based on the target position of each mesh vertex of the virtual clothing, the initial position of each mesh vertex of the virtual clothing, the target position of each neighboring mesh vertex of each mesh vertex of the virtual clothing, and the initial position of each neighboring mesh vertex of each mesh vertex of the virtual clothing comprises:

acquiring a first positional difference between each mesh vertex and each neighboring mesh vertex, the first positional difference between any mesh vertex and any neighboring mesh vertex is a difference between a target position of the neighboring mesh vertex and a target position of the mesh vertex;

acquiring a second positional difference between each mesh vertex and each neighboring mesh vertex, the second positional difference between any mesh vertex and any neighboring mesh vertex is a difference between an initial position of the neighboring mesh vertex and an initial position of the mesh vertex;

acquiring a first matrix corresponding to each neighboring mesh vertex of each mesh vertex, the first matrix corresponding to any neighboring mesh vertex of any mesh vertex is a tensor product of the first positional difference between the mesh vertex and the neighboring mesh vertex and the second positional difference between the mesh vertex and the neighboring mesh vertex;

acquiring a first feature matrix of each mesh vertex, the first feature matrix of any mesh vertex is a sum of first matrices corresponding to neighboring mesh vertexes of the mesh vertex;

acquiring a second matrix corresponding to each neighboring mesh vertex of each mesh vertex, the second matrix corresponding to any neighboring mesh vertex of any mesh vertex is a tensor product of the second positional difference between the mesh vertex and the neighboring mesh vertex and the second positional difference between the mesh vertex and the neighboring mesh vertex;

acquiring a second feature matrix of each mesh vertex, the second feature matrix of any mesh vertex is a sum of second matrices corresponding to neighboring mesh vertexes of the mesh vertex;

acquiring a third feature matrix of each mesh vertex, the third feature matrix of any mesh vertex is a product of the first feature matrix of the mesh vertex and an inverse matrix of the second feature matrix of the mesh vertex;

acquiring a fourth feature matrix of each mesh vertex, the fourth feature matrix of any mesh vertex is a product of a transposed matrix of the third feature matrix of the mesh vertex and the third feature matrix of the mesh vertex; and acquiring a minimum eigenvalue and an eigenvector of the fourth feature matrix of each mesh vertex, and using the minimum eigenvalue and the eigenvector as the compression ratio and the compression direction of each mesh vertex, respectively.

7. The method according to claim 5, wherein generating the wrinkle height field formed by the virtual clothing based on the compression ratio and the compression direction of each mesh vertex of the virtual clothing comprises:

acquiring a height value of each mesh vertex of the virtual clothing based on the compression ratio of each mesh vertex of the virtual clothing, the height value of any mesh vertex is a product of a first computed value corresponding to the mesh vertex and a first constant, and the first computed value corresponding to any mesh vertex is a difference between a second constant and the compression ratio of the mesh vertex;

acquiring an impact value of each position of the virtual clothing, the impact value of any position comprises an impact value, on the position, of each mesh vertex of a mesh to which the position belongs, the impact value of any mesh vertex on any position comprises a product of the height value of the mesh vertex and a corresponding height retention rate, the height retention rate of any position to any mesh vertex is a cosine of the compression direction of the mesh vertex and a corresponding positional difference, and the positional difference of any position to any mesh vertex is a positional difference of the position to the target position of the mesh vertex;

acquiring a height of each position of the virtual clothing based on the impact value of each position of the virtual clothing; and acquiring the wrinkle height field formed by the virtual clothing based on the height of each position of the virtual clothing.

8. The method according to claim 1, wherein before acquiring the target position of each mesh vertex of the virtual clothing based on the posture information, the method further comprises:

merging mesh vertexes, having a same position, among the mesh vertexes of the virtual clothing to generate the virtual clothing with fully connected topology.

9. A computer-readable storage medium, the computer-readable storage medium stores a computer program which, when executed by a computing device, causes the computing device to implement the method for rendering the virtual clothing of claim 1.

10. An apparatus for rendering virtual clothing, comprising:

an acquisition unit, configured to acquire posture information of a target object;

a drive unit, configured to acquire a target position of each mesh vertex of the virtual clothing based on the posture information, the target position of each mesh vertex of the virtual clothing comprises a position of each mesh vertex of the virtual clothing after the virtual clothing is deformed based on the posture information;

a processing unit, configured to acquire a normal direction of each position of the virtual clothing based on the target position of each mesh vertex of the virtual clothing; and a rendering unit, configured to render the virtual clothing based on the normal direction of each position of the virtual clothing and output a rendered effect image of the virtual clothing, wherein the processing unit is further configured to:

generate a wrinkle height field formed by the virtual clothing, and acquire the normal direction of each position of the virtual clothing based on the wrinkle height field, wherein when acquiring the normal direction of each position of the virtual clothing based on the wrinkle height field, the processing unit is further configured to:

acquire a gradient of each position of the virtual clothing based on the wrinkle height field; and acquire the normal direction of each position of the virtual clothing by making a difference between an initial normal direction of each position of the virtual clothing and the gradient of each position of the virtual clothing.

11. The apparatus according to claim 10, wherein the drive unit is configured to:

acquire a bone transform matrix of at least one bone in a skeleton model of the target object based on the posture information, the bone transform matrix of any bone is a matrix that transforms the bone from an initial position to a position corresponding to the posture information; and calculate to obtain the target position of each mesh vertex of the virtual clothing based on the bone transform matrix of the at least one bone and skin information of the at least one bone; wherein the skin information of any bone comprises an impact weight of the bone on each mesh vertex of the virtual clothing.

12. The apparatus according to claim 11, wherein the drive unit is configured to:

acquire an impact value of each bone of the at least one bone on each mesh vertex of the virtual clothing, the impact value of any bone on any mesh vertex comprises a product of the impact weight of the bone on the mesh vertex, the bone transform matrix of the bone, and an initial position of the mesh vertex; and sum impact values of the at least one bone on a same mesh vertex of the virtual clothing to acquire the target position of each mesh vertex of the virtual clothing.

13. The apparatus according to claim 11, wherein the apparatus further comprises:

an extraction unit, configured to acquire a target image and extract the skeleton model of the target object based on the target image before the drive unit acquires the bone transform matrix of the at least one bone in the skeleton model of the target object based on the posture information, the target image comprises the target object.

14. The apparatus according to claim 10, wherein before generating the wrinkle height field formed by the virtual clothing, the processing unit is further configured to:

acquire a compression ratio and a compression direction of each mesh vertex of the virtual clothing based on the target position of each mesh vertex of the virtual clothing, an initial position of each mesh vertex of the virtual clothing, a target position of each neighboring mesh vertex of each mesh vertex of the virtual clothing, and an initial position of each neighboring mesh vertex of each mesh vertex of the virtual clothing;

wherein when generating the wrinkle height field formed by the virtual clothing, the processing unit is configured to:

generate the wrinkle height field formed by the virtual clothing based on the compression ratio and the compression direction of each mesh vertex of the virtual clothing.

15. The apparatus according to claim 14, wherein the processing unit is configured to:

acquire a first positional difference between each mesh vertex and each neighboring mesh vertex, the first positional difference between any mesh vertex and any neighboring mesh vertex is a difference between a target position of the neighboring mesh vertex and a target position of the mesh vertex;

acquire a second positional difference between each mesh vertex and each neighboring mesh vertex, the second positional difference between any mesh vertex and any neighboring mesh vertex is a difference between an initial position of the neighboring mesh vertex and an initial position of the mesh vertex;

acquire a first matrix corresponding to each neighboring mesh vertex of each mesh vertex, the first matrix corresponding to any neighboring mesh vertex of any mesh vertex is a tensor product of the first positional difference between the mesh vertex and the neighboring mesh vertex and the second positional difference between the mesh vertex and the neighboring mesh vertex;

acquire a first feature matrix of each mesh vertex, the first feature matrix of any mesh vertex is a sum of first matrices corresponding to neighboring mesh vertexes of the mesh vertex;

acquire a second matrix corresponding to each neighboring mesh vertex of each mesh vertex, the second matrix corresponding to any neighboring mesh vertex of any mesh vertex is a tensor product of the second positional difference between the mesh vertex and the neighboring mesh vertex and the second positional difference between the mesh vertex and the neighboring mesh vertex;

acquire a second feature matrix of each mesh vertex, the second feature matrix of any mesh vertex is a sum of second matrices corresponding to neighboring mesh vertexes of the mesh vertex;

acquire a third feature matrix of each mesh vertex, the third feature matrix of any mesh vertex is a product of the first feature matrix of the mesh vertex and an inverse matrix of the second feature matrix of the mesh vertex;

acquire a fourth feature matrix of each mesh vertex, the fourth feature matrix of any mesh vertex is a product of a transposed matrix of the third feature matrix of the mesh vertex and the third feature matrix of the mesh vertex; and acquire a minimum eigenvalue and an eigenvector of the fourth feature matrix of each mesh vertex, and using the minimum eigenvalue and the eigenvector as the compression ratio and the compression direction of each mesh vertex, respectively.

16. The apparatus according to claim 14, wherein the processing unit is configured to:

acquire a height value of each mesh vertex of the virtual clothing based on the compression ratio of each mesh vertex of the virtual clothing, the height value of any mesh vertex is a product of a first computed value corresponding to the mesh vertex and a first constant, and the first computed value corresponding to any mesh vertex is a difference between a second constant and the compression ratio of the mesh vertex;

acquire an impact value of each position of the virtual clothing, the impact value of any position comprises an impact value, on the position, of each mesh vertex of a mesh to which the position belongs, the impact value of any mesh vertex on any position comprises a product of the height value of the mesh vertex and a corresponding height retention rate, the height retention rate of any position to any mesh vertex is a cosine of the compression direction of the mesh vertex and a corresponding positional difference, and the positional difference of any position to any mesh vertex is a positional difference of the position to the target position of the mesh vertex;

acquire a height of each position of the virtual clothing based on the impact value of each position of the virtual clothing; and acquire the wrinkle height field formed by the virtual clothing based on the height of each position of the virtual clothing.

17. The apparatus according to claim 10, wherein, the apparatus further comprises:

a generation unit, configured to merge mesh vertexes, having a same position, among the mesh vertexes of the virtual clothing to generate the virtual clothing with fully connected topology before the drive unit acquires the target position of each mesh vertex of the virtual clothing based on the posture information.

18. An electronic device, comprising a memory and a processor, wherein the memory is configured to store a computer program, the processor is configured to, when executing the computer program, cause the electronic device to implement a method for rendering virtual clothing, wherein the method comprises:

acquiring posture information of a target object;

acquiring a target position of each mesh vertex of the virtual clothing based on the posture information, the target position of each mesh vertex of the virtual clothing comprises a position of each mesh vertex of the virtual clothing after the virtual clothing is deformed based on the posture information;

acquiring a normal direction of each position of the virtual clothing based on the target position of each mesh vertex of the virtual clothing; and rendering the virtual clothing based on the normal direction of each position of the virtual clothing and outputting a rendered effect image of the virtual clothing, wherein acquiring the normal direction of each position of the virtual clothing based on the target position of each mesh vertex of the virtual clothing comprises:

generating a wrinkle height field formed by the virtual clothing, and acquiring the normal direction of each position of the virtual clothing based on the wrinkle height field;

wherein acquiring the normal direction of each position of the virtual clothing based on the wrinkle height field comprises:

acquiring a gradient of each position of the virtual clothing based on the wrinkle height field; and acquiring the normal direction of each position of the virtual clothing by making a difference between an initial normal direction of each position of the virtual clothing and the gradient of each position of the virtual clothing.

* * * * *